United States Patent
Chae et al.

(10) Patent No.: US 9,930,628 B2
(45) Date of Patent: Mar. 27, 2018

(54) METHOD AND APPARATUS FOR ATTAINING DEVICE-TO-DEVICE SYNCHRONIZATION IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/101,751

(22) PCT Filed: Dec. 5, 2014

(86) PCT No.: PCT/KR2014/011926
§ 371 (c)(1),
(2) Date: Jun. 3, 2016

(87) PCT Pub. No.: WO2015/084103
PCT Pub. Date: Jun. 11, 2015

(65) Prior Publication Data
US 2016/0309430 A1 Oct. 20, 2016

Related U.S. Application Data

(60) Provisional application No. 61/912,532, filed on Dec. 5, 2013.

(51) Int. Cl.
*H04W 56/00* (2009.01)
*H04W 72/04* (2009.01)
(Continued)

(52) U.S. Cl.
CPC ....... *H04W 56/00* (2013.01); *H04W 56/0025* (2013.01); *H04W 72/0446* (2013.01);
(Continued)

(58) Field of Classification Search
CPC ............. H04W 56/00; H04W 56/0025; H04W 72/0446; H04W 76/023
See application file for complete search history.

(56) References Cited

U.S. PATENT DOCUMENTS 7,626,966 B1 * 12/2009 Ruiter ................... H04M 1/725
370/310
2011/0149799 A1 6/2011 Wu et al.
(Continued)

FOREIGN PATENT DOCUMENTS

KR 10-2011-0087323 A 8/2011
KR 10-2012-0112637 A 10/2012
(Continued)

OTHER PUBLICATIONS

ETRI, "On the D2DSS and PD2DSCH," 3GPP TSG-RAN1 Meeting #75, R1-135277, San Francisco, USA, Nov. 11-15, 2013, pp. 1-7.

*Primary Examiner* — Gbemileke J Onamuti
(74) *Attorney, Agent, or Firm* — Birch, Stewart, Kolasch & Birch, LLP

(57) ABSTRACT

One embodiment of the present invention relates to a method for a terminal attaining device-to-device (D2D) synchronization in a wireless communication system, the method comprising the steps of: receiving a sub-frame containing a D2D synchronization signal; and attaining time/frequency synchronization on the basis of the sub-frame, wherein if an apparatus for transmitting the D2D synchronization signal is a D2D terminal, then the sub-frame may include information regarding the frequency stability.

11 Claims, 6 Drawing Sheets

(51) Int. Cl.
*H04W 76/02* (2009.01)
*H04W 52/02* (2009.01)

(52) U.S. Cl.
CPC ...... *H04W 76/023* (2013.01); *H04W 52/0209* (2013.01); *Y02B 60/50* (2013.01)

(56) References Cited

U.S. PATENT DOCUMENTS

| | | |
|---|---|---|
| 2011/0230139 A1 | 9/2011 | Nakahara |
| 2014/0269641 A1 | 9/2014 | Jang et al. |
| 2014/0321452 A1 | 10/2014 | Choi et al. |
| 2014/0376458 A1* | 12/2014 | Ryu ............ H04W 72/085 370/329 |
| 2015/0043398 A1* | 2/2015 | Fwu ............ H04W 64/006 370/280 |
| 2016/0242065 A1* | 8/2016 | Fukuta .......... H04W 72/04 |
| 2016/0286507 A1* | 9/2016 | Yang ............ H04W 8/005 |

FOREIGN PATENT DOCUMENTS

| | | |
|---|---|---|
| WO | WO 2013/066126 A1 | 5/2013 |
| WO | WO 2013/081393 A1 | 6/2013 |

\* cited by examiner

METHOD AND APPARATUS FOR ATTAINING DEVICE-TO-DEVICE SYNCHRONIZATION IN WIRELESS COMMUNICATION SYSTEM

CROSS REFERENCE TO RELATED APPLICATIONS

This application is the National Phase of PCT International Application No. PCT/KR2014/011926, filed on Dec. 5, 2014, which claims priority under 35 U.S.C. 119(e) to U.S. Provisional Application No. 61/912,532, filed on Dec. 5, 2013, all of which are hereby expressly incorporated by reference into the present application.

TECHNICAL FIELD

The present invention relates to a wireless communication system, and more particularly, to a method and apparatus for acquiring synchronization in device-to-device communication.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

D2D communication is a communication scheme in which a direct link is established between User Equipments (UEs) and the UEs exchange voice and data directly with each other without intervention of an evolved Node B (eNB). D2D communication may cover UE-to-UE communication and peer-to-peer communication. In addition, D2D communication may find its applications in Machine-to-Machine (M2M) communication and Machine Type Communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, the overhead of a network may be reduced. Further, it is expected that the introduction of D2D communication will reduce the power consumption of devices participating in D2D communication, increase data transmission rates, increase the accommodation capability of a network, distribute load, and extend cell coverage.

DISCLOSURE OF THE INVENTION

Technical Task

The technical task of the present invention is to provide a method for a D2D device to acquire synchronization in D2D communication and related signaling.

Technical tasks obtainable from the present invention are non-limited by the above-mentioned technical task. And, other unmentioned technical tasks can be clearly understood from the following description by those having ordinary skill in the technical field to which the present invention pertains.

TECHNICAL SOLUTIONS

In a first technical aspect of the present invention, provided herein is a method of obtaining D2D (device-to-device) synchronization, which is obtained by a user equipment in a wireless communication system, including the steps of receiving a subframe containing a D2D synchronization signal and acquiring time/frequency synchronization on the basis of the subframe. If a device that transmits the D2D synchronization signal corresponds to a D2D user equipment, the subframe may include information related to frequency stability.

In a second technical aspect of the present invention, provided herein is a D2D (device-to-device) user equipment for obtaining D2D synchronization, including a receiving module and a processor. The processor is configured to receive a subframe containing a D2D synchronization signal and acquire time/frequency synchronization on the basis of the subframe. If a device that transmits the D2D synchronization signal corresponds to a D2D user equipment, the subframe may include information related to frequency stability.

All or some of the following matters may be included in the first and second technical aspects of the present invention.

The information related to the frequency stability may be transmitted through a physical D2D synchronization channel (PD2DSCH).

The user equipment may estimate the frequency stability through a period of transmitting the D2D synchronization signal.

The information related to the frequency stability may include information on a time at which the device that transmits the D2D synchronization signal obtains synchronization and information on the device that transmits the D2D synchronization signal.

If the user equipment is in an RRC (radio resource control) idle state, the subframe may include the information related to the frequency stability.

If a stratum level difference between a user equipment that transmits the D2D synchronization signal and the user equipment is equal to or greater than a predetermined value, the subframe may include the information related to the frequency stability.

If a period of transmitting the D2D synchronization signal is equal to or greater than a predetermined value, the subframe may include the information related to the frequency stability.

If an operating frequency band of the user equipment is equal to or greater than a predetermined value, the subframe may include the information related to the frequency stability.

The user equipment may estimate the frequency stability through a sequence of the D2D synchronization signal.

The user equipment may estimate the frequency stability through a sequence repetition pattern of the D2D synchronization signal.

A sequence of a D2D synchronization signal used when the device that transmits the D2D synchronization signal corresponds to a base station may be different from a sequence of a D2D synchronization signal used when the device that transmits the D2D synchronization signal corresponds to the D2D user equipment.

If the frequency stability is equal to or lower than a predetermined value, the user equipment may shorten a period of receiving the D2D synchronization signal.

If the frequency stability is equal to or lower than a predetermined value, the user equipment may modify the D2D synchronization before transmitting and receiving a D2D signal.

Advantageous Effects

According to the present invention, a D2D user equipment can reduce frequency offset when obtaining synchronization.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Figure 1:
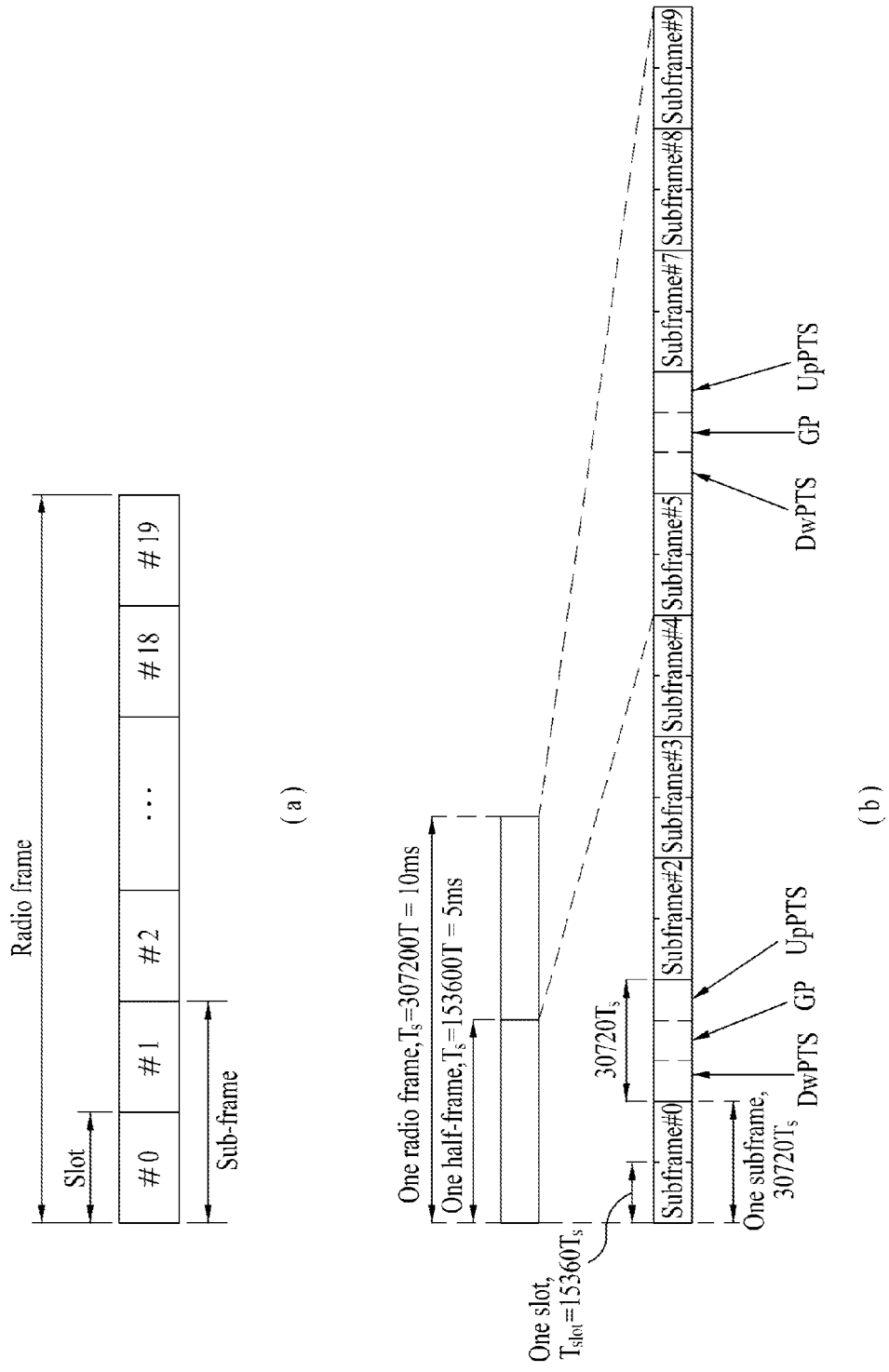
FIG. 1 is a diagram illustrating a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc. In addition, in the following embodiments, the term "base station" may mean an apparatus such as a scheduling node or a cluster header. If the base station or the relay transmits a signal transmitted by a terminal, the base station or the relay may be regarded as a terminal.

The term "cell" may be understood as a base station (BS or eNB), a sector, a Remote Radio Head (RRH), a relay, etc. and may be a comprehensive term referring to any object capable of identifying a component carrier (CC) at a specific transmission/reception (Tx/Rx) point.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
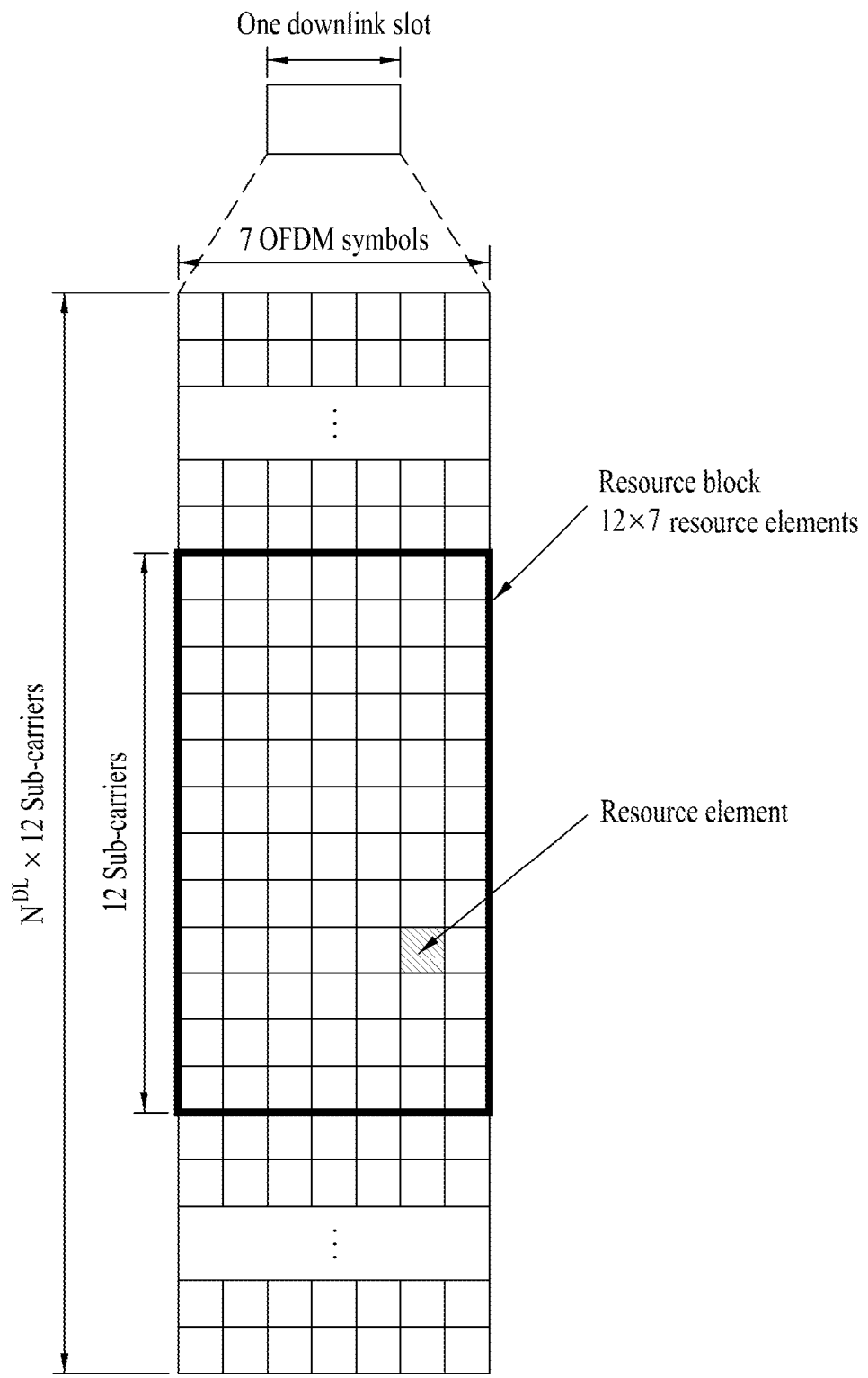
FIG. 2 is a diagram illustrating a resource grid of a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
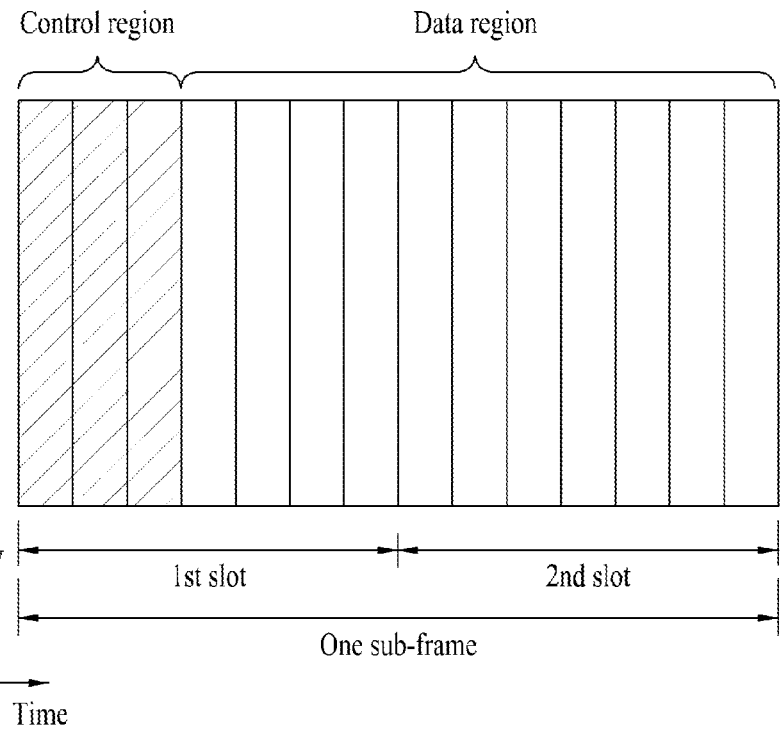
FIG. 3 is a diagram illustrating a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
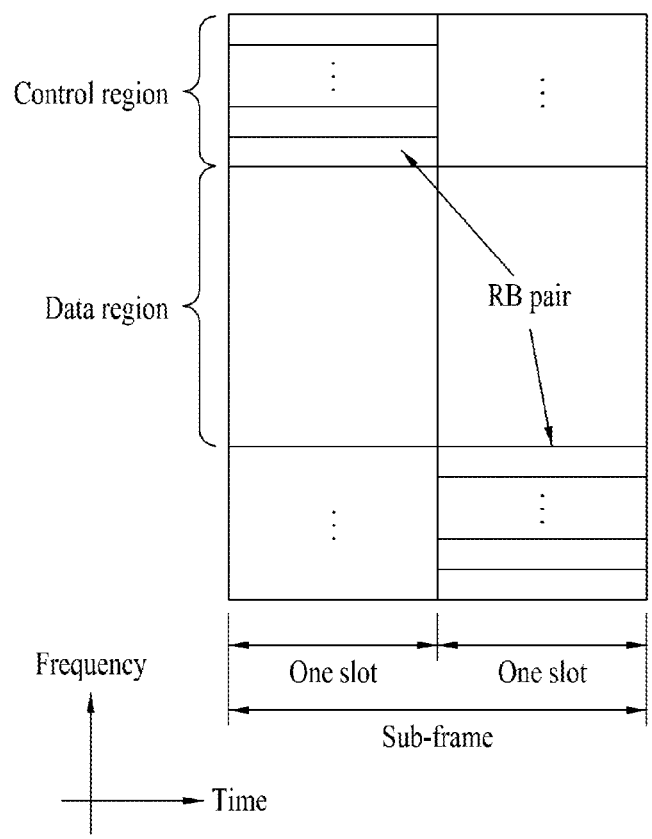
FIG. 4 is a diagram illustrating a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Problems Related to Frequency Offset and Synchronization Acquisition of D2D UE

Hereinafter, description will be given of acquisition of synchronization between UEs in D2D communication based on the above description and the legacy LTE/LTE-A system. In the OFDM system, if time/frequency synchronization is not matched, OFDM signals may not be multiplexed between different UEs due to inter-cell interference. Moreover, it is not efficient that all D2D UEs individually match synchronization by directly transmitting and receiving synchronization signals. Accordingly, in a distributed node system such as the D2D system, a specific node may transmit a representative synchronization signal and other UEs may match synchronization with reference to the representative synchronization signal. In the present invention, it is assumed that some nodes (here, the node may correspond to an eNB, UE, or SRN (synchronization reference node)) transmit synchronization signals (e.g., D2DSS (Here, D2DSS may mean a signal that enables a D2D UE to match synchronization. When an eNB transmits D2DSS, the D2DSS may be PSS/SSS. And, when a specific UE transmits D2DSS, the D2DSS may be different from the PSS/SSS.)) for D2D signal transmission and reception and other UEs transceive signals by matching synchronization with reference to the synchronization signals.

The SRN may be a node for transmitting PD2DSCH, which may include information on the D2DSS and the SRN. The D2DSS may be implemented in the form of a specific sequence and the PD2DSCH may have the form of a sequence representing specific information or the form of a codeword obtained through predetermined channel coding. Herein, the SRN may be an eNB or a specific D2D UE. For instance, when UEs match synchronization with each other with reference to an eNB, the SRN is the eNB and the D2DSS is the PSS/SSS. In the case of 'partial network coverage' or 'out of network coverage', a UE may be the SRN. In the case of 'inter-cell discovery', a UE may relay the D2DSS at a time obtained by adding prescribed offset to a timing at which UEs receive the D2DSS from the SRN in order to inform UEs in a neighboring cell of the timing. In this case, the D2DSS transmitted by the SRN and the D2DSS relayed by the UE may use the same format. However, in some cases, they may be transmitted in different formats to distinguish which D2DSS is transmitted from which node.

The physical D2D synchronization channel (PD2DSCH) may mean a (broadcast) channel for carrying basic (system) information (e.g., D2DSS related information, duplex mode, TDD configuration, information on a resource pool, etc.) which a UE needs to know before transmitting and receiving a D2D signal.

Meanwhile, in case that a D2D UE receives a subframe containing D2DSS and acquires synchronization on the basis of the received subframe, frequency offset may become an issue. Table 1 below shows examples of frequency offset requirements of an eNB. Moreover, a UE may also have offset requirements similar to those in Table 1.

TABLE 1

| class | Accuracy |
| --- | --- |
| 1 (i.e. Wide Area BS) | +−(0.05 ppm + 12 Hz) |
| 2 (i.e. Medium Range BS) | +−(0.1 ppm + 12 Hz) |
| 3 (i.e. Local Area BS) | +−(0.1 ppm + 12 Hz) |
| 4 (i.e. Home BS) | +−(0.25 ppm + 12 Hz) |

Figure 5:
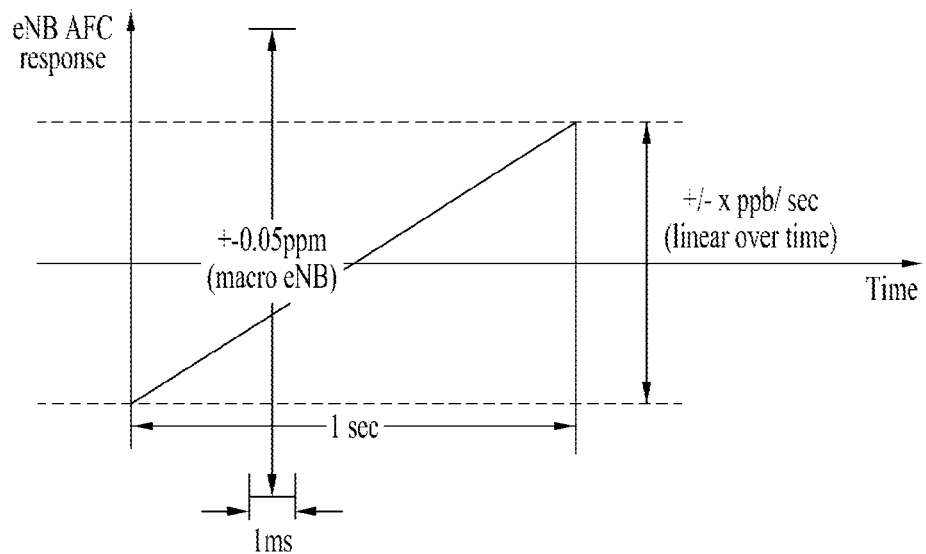
FIG. 5 and FIG. 6 are diagrams for describing frequency offset.
Figure 6:
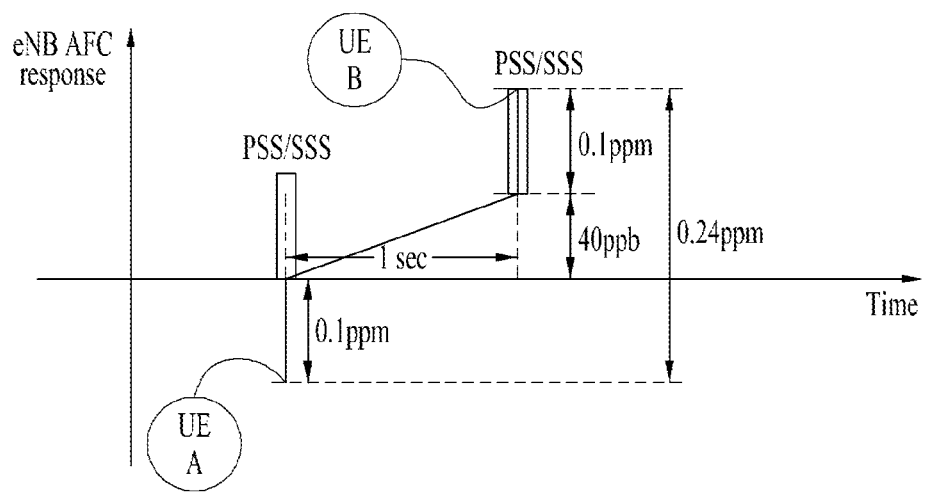

In addition, since a frequency oscillator of the eNB or UE is defective, it may be changed depending on time. For instance, assuming that stability is +−40 ppb/sec with reference to FIG. 5, stability of the frequency oscillator of the eNB may fluctuate with +−0.04 ppm/sec. In this case, even though UEs obtain synchronization from the same synchronization source, if timings at which the synchronization is obtained (e.g., timings at which the D2DSS is received) are different, it may cause additional frequency offset. For example, referring to FIG. 6, when UE A and UE B, which operate in 2 GHz carrier frequency, obtain synchronization from PSS/SSS of an eNB, respectively, if a synchronization acquisition timing of the UE A is different from that of the UE B by as much as one second, maximum 480 Hz of frequency offset may be caused. In addition, in case that the UE A and UE B obtain the synchronization at the same timing, 400 Hz of frequency offset may occur. Moreover, if a difference between the synchronization acquisition timings of the two UEs is greater than one second, maximum 600 Hz of frequency offset (in the case of 'macro') or maximum 800 Hz of frequency offset (in the case of 'pico') may occur.

Further, if the UE A and UE B obtain synchronization from different eNBs and then operate in 2 GHz carrier frequency, 600 Hz of frequency offset (macro) or 800 Hz of frequency offset (pico) may be caused.

Figure 7:
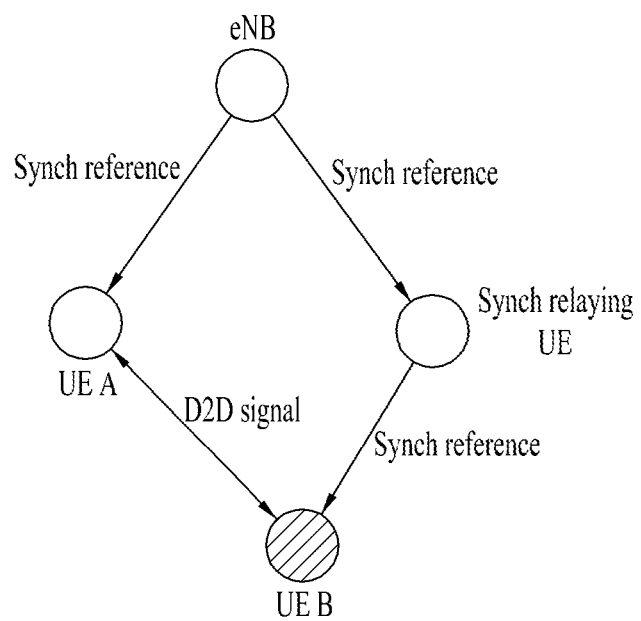
FIG. 7 is a diagram illustrating an environment for obtaining D2D synchronization.

As shown in FIG. 7, when UE A acquires synchronization from an eNB and UE B acquires synchronization from a synchronization relaying UE, frequency offset has the following values. If a reference timing of the synchronization relaying is equal to a timing at which the UE A acquires the synchronization and transmits data, the frequency offset may be 600 Hz. If the reference timing of the synchronization relaying is different from the timing at which the UE A acquires the synchronization and transmits the data (for example, by as much as one second), the frequency offset may be 680 Hz. If the reference timing of the synchronization relaying is different from the timing at which the UE A acquires the synchronization and transmits the data and if the UE B has additional one second delay in acquiring the synchronization, the frequency offset may be 760 Hz.

If a transmission period of D2DSS is higher than that of existing PSS/SSS, a UE may not receive the D2DSS frequently. Moreover, since the UE is unable to perform an operation of refining frequency offset, frequency synchronization may be continuously changed. In this case, even if synchronization is matched at the same timing, the frequency offset may be continuously changed until a new synchronization signal is received. For instance, even if two UEs match synchronization with reference to the same D2DSS, maximum 80 ppb difference may occur after elapse of one second. And, this may mean 160 Hz of additional frequency offset in the case of 2 GHz carrier frequency. That is, in the case of the above-mentioned maximum frequency offset, the additional offset may occur after elapse of time. Therefore, this means that when the transmission period of the D2DSS is configured, the following requirements should be considered. The D2DSS needs to be transmitted again within the scope of handling the additional frequency offset.

When the D2DSS is continuously transmitted, a D2D UE needs to match synchronization with reference to the D2DSS at least within a specific period.

In other words, the frequency offset of the D2D UE may be affected by which source (or which D2DSS) the D2D UE acquires the synchronization from or which timing the D2D UE obtains the synchronization at. When the same synchronization source is used, the frequency offset may be affected by whether the synchronization source is an eNB or a UE. When different synchronization sources are used, the frequency offset may be affected by whether the synchronization sources are eNBs or UEs and/or a hop difference between the synchronization sources. Moreover, the frequency offset may be affected by mobility of a UE, a D2DSS structure and the like.

The above-mentioned frequency offset problem may be increased when D2D communication is performed through the D2DSS. On the contrary, if an in-network coverage UE is in an RRC connected state in which the UE continuously receives a synchronization signal from an eNB, frequency offset due to a synchronization reception timing difference may be small since the eNB is highly likely to have a relatively stable AFC circuit. That is, the frequency offset problem may be increased when one UE receives a synchronization signal from an eNB and another UE acquires/estimates synchronization with reference to D2DSS, which is created for the purpose of relaying synchronization of the eNB (or a different UE). Moreover, even in the case of the in-network coverage UE, if the UE is in an RRC idle state, the UE cannot continuously detect the synchronization signal transmitted from the eNB, additional frequency offset may occur due to its changed AFC.

The aforementioned problem caused by the frequency offset in D2D communication (i.e., the problem related to frequency stability of the synchronization source oscillator) can be solved by transmitting information on frequency stability to UEs or enabling D2D UEs to match synchronization at the same time or within a specific duration. Hereinafter, description will be given of the above solution. The present invention can be applied to a situation that additional offset occurs and the additional offset may occur in the following cases: synchronization is obtained from D2DSS transmitted by a UE; RRC idle UEs fail to match synchronization frequently; two D2D UEs have different stratum levels; a timing at which a D2D UE obtains synchronization from D2DSS is significantly different from one another; and a high frequency band is used. In other words, in case that a UE acquires time/frequency synchronization by receiving a subframe containing a D2D synchronization signal, information related to frequency stability can be included in the subframe in at least one of the following cases: a device that transmits the D2D synchronization signal corresponds to a D2D UE; the UE is in an RRC idle state; a stratum level difference between the UE that transmits the D2D synchronization signal and the UE is equal to or greater than a predetermined value; a period for the D2D synchronization signal is transmitted is equal to or greater than a predetermined value; and an operating frequency band of the UE is equal to or greater than a predetermined value. Alternatively, in at least one of the above-mentioned cases, UEs may match synchronization within a specific duration according to methods, which will be described below.

Transmission of Information Related to Frequency Stability

Information related to frequency stability may be transmitted through (by being included) D2DSCH or D2DSS.

The information related to frequency stability may include information on D2DSS used to obtain synchronization, information on a timing at which synchronization is obtained, information on a node that transmit D2DSS or information on oscillator stability of a node that transmit D2DSS. The stability can be grouped according to the offset requirements of Table 1 (or by utilizing the offset requirements).

The information indicating the frequency stability of the oscillator of the node that transmit the D2DSS may be included in PD2DSCH, which carries information on specific D2DSS. Moreover, oscillator stability of a source, which is referred by the node that transmits the D2DSS, may be included in the PD2DSCH.

A UE can estimate the frequency stability through a period for which the D2DSS is transmitted, which is included in the PD2DSCH. In other words, a method for recommending a period of receiving D2DSS according to stability can also be implemented, which is different from a method of directly indicating oscillator stability of a node that transmits D2DSS through PD2DSCH. For instance, a node with a poor performance oscillator may transmit a minimum reception period by including the minimum reception period in PD2DSCH in order to enable a UE, which will receive D2DSS, to receive the D2DSS more frequently. On the other hand, a UE with a good performance oscillator may have a minimum reception period longer than that of the former case.

As another method, information on a D2DSS transmission period may be transmitted in a manner that the information on the D2DSS transmission period is explicitly included in PD2DSCH. That is, the information may correspond to information for requesting UEs to receive D2DSS within the corresponding period.

The information related to the frequency stability may be transmitted by being included in the D2DSS or through the D2DSS. According to the stability, transmission formats of the D2DSS can be differentiated. In this case, the transmission formats are differentiated in order to reflect some or all of a sequence, ID of a sequence, the number of repetition or a pattern (if a sequence is repeated), a time required for sequence transmission, a frequency location, and the like.

For instance, a UE can estimate the frequency stability through a sequence of the D2D synchronization signal. That is, the corresponding information can be included in a specific sequence of D2DSS or specific ID of a sequence. Assuming that PSS/SSS is used as D2DSS, a specific sequence or specific ID of a sequence may be used when an oscillator has stability equal to or lower than a prescribed level. And, a different specific sequence or a different specific sequence ID may be used when the stability is equal to or higher than the prescribed level.

A UE can estimate the frequency stability through a sequence repetition pattern of the D2D synchronization signal. In detail, in case that a specific sequence is repeated, if a repetition pattern of the sequence is changed, the UE may estimate the stability through the change in the repetition pattern. In other words, when the specific sequence is repeated, a specific repetition pattern may be used for the purpose of indicating the stability of the oscillator. For instance, in case that specific ID of PSS is repeated, when the stability is equal to or lower than a prescribed level, last PSS uses a base sequence as the same as that of previously transmitted PSS. When the stability is equal to or higher than the prescribed level, the last PSS is transmitted using the base sequence as the same as that of the previously transmitted PSS.

A sequence of a D2D synchronization signal transmitted by an eNB may be different from that of a D2D synchronization signal transmitted by a D2D UE. In other words, the D2DSS transmitted by the UE may be a synchronization signal with a form different from that of the PSS/SSS transmitted by the eNB. In addition, in case of the D2DSS transmitted by the UE, if a stratum level is different, the D2DSS may have a different form according to the stratum level. For instance, when the stratum level is 2, PSS is simply repeated. When the stratum level is 3, the repeated form is used but a partial base sequence of last PSS is changed.

Moreover, the stability of the oscillator may be indicated in a manner of changing a transmission timing or a frequency location. For instance, when the stratum level is 1, the synchronization signal is transmitted at a center carrier frequency. When the stratum level is equal to or greater than 2, the synchronization signal is transmitted in a domain that does not include the center carrier frequency. Alternatively, when the stability of the oscillator is equal to or smaller than a prescribed threshold, the synchronization signal is transmitted at the center carrier frequency. Otherwise, the synchronization signal is transmitted in the domain except the center carrier frequency.

The transmission of the information on the frequency stability or the information on the D2DSS transmission period through the PD2DSCH may be changed according to a carrier frequency. This is because in the case of a low carrier frequency, a normalized frequency offset size is reduced and thus the frequency stability may be increased compared to the case of a high carrier frequency. For instance, a UE may set the information on the frequency stability or the information on the D2DSS transmission period differently according to the carrier frequency. As an extreme example, a rule may be defined such that when the carrier frequency is equal to or lower than a prescribed value, D2D UEs assumes a predetermined specific value instead of transmission and reception of the corresponding information through the PD2DSCH.

UE's Operation after Reception of Information on Frequency Stability

The stability information may provide a clue that enables a UE, which receives D2DSS, to estimate when or how many times the UE should match synchronization to prevent additional frequency offset. That is, after receiving the information related to the frequency stability, the UE may reduce a period for which the D2D synchronization signal is received if the frequency stability is equal to or lower than a predetermined value. Alternatively, the UE may modify D2D synchronization before transmitting and receiving a D2D signal if the frequency stability is equal to or lower than the predetermined value. In particular, if two UEs receive the same D2DSS, while stability of an oscillator is not sufficiently good, the two UEs need to match synchronization by receiving synchronization signals more frequently or make synchronization timings obtained from the D2DSS be equal to each other during a prescribed time before transmitting and receiving D2D signals.

If the frequency stability is greater than the predetermined value (i.e., if the oscillator is stable), the two UEs may not have the additional frequency offset even though the two UEs match the synchronization through the D2DSS at different timings. Thus, in this case, if there is no data transmission, a D2D UE may stop the synchronization signal reception and then switch to sleep mode to save battery consumption.

Adjustment of Synchronization Acquisition Timings of D2D UEs

In order for D2D UEs to obtain synchronization at the same time (or within a prescribed duration), the following methods can be applied.

First of all, D2DSS may be transmitted more frequently and a D2D UE may obtain synchronization by receiving all available D2DSSs. That is, a D2DSS transmission period can be shortened. This method can be simply implemented and all UEs may reduce frequency errors. A rule may be defined such that even if a UE is in DRX mode or DTX mode, the UE performs transmission/reception of D2DSS exceptionally.

In addition, before transmitting and receiving a D2D signal, a UE can wake up and then receive a synchronization signal during a prescribed time. That is, a rule may be defined such that a UE wakes up before the prescribed time and then receives the synchronization signal in order to transmit/receive the D2D signal. Particularly, in case of a UE which does not receive the D2DSS frequently like an RRC idle UE, a rule may be defined so that the UE should have a frequency error with respect to an eNB or UE that transmits the D2DSS lower than a prescribed level before transmitting/receiving the D2D signal. This rule may be applied to all D2D UEs. That is, after receiving the D2DSS, a UE may match synchronization at a timing sufficiently close to a transmission timing in consideration of its oscillator stability and then initiate transmission. In this case, oscillator stability of a node that transmits the D2DSS may be considered together. This is because if the oscillator of the node that transmits the D2DSS is stable, requirements can be satisfied even though the synchronization is matched earlier.

Moreover, a specific UE (a cluster head, a UE that transmits D2DSS, or another specific UE different from the UE that transmits the D2DSS) or an eNB may be indicated to enable D2D UEs to receive synchronization at the same timing. A signal for enabling a specific UE or a UE group to receive the D2DSS per minimum×ms period may be transmitted from another specific UE or the eNB.

Furthermore, a D2D signal transmission UE may perform transmission by including information indicating a synchronization signal reception timing for a D2D reception UE. That is, after receiving D2DSS, a UE may transmit information on the D2DSS, which is used by the UE to match synchronization, by including the information in D2D CI (control information) before transmitting/receiving a D2D signal. Alternatively, the UE may include the corresponding information in a specific sequence transmitted together with the D2D signal. For instance, DMRS transmitted together with the D2D signal, a CS (cyclic shift) pattern of the specific sequence transmitted together with the D2D signal, or a specific base sequence may be used for the purpose of indicating the D2DSS reception timing.

In the above description, information on a timing may be represented as a specific subframe level/unit or a radio frame level/unit. Alternatively, the information may be represented as a time like within several ms (e.g., several SFs, several radio frames, etc.) from a specific timing. The above information on the timing at which the synchronization is matched through the D2DSS can be used for the purpose of recommending another UE to match synchronization at a similar timing.

On the other hand, a period of matching synchronization can be changed according to oscillator stability of a UE that transmits and receives the D2D signal, which is different from the oscillator stability of the node that transmits the D2DSS described above. For instance, assuming that two D2D UEs receive D2DSS transmitted from an eNB or UE and one of the two D2D UEs has high stability of an oscillator and the other one has low stability of an oscillator, the former D2D UE may wake up less frequently and then perform an operation of receiving the D2DSS and the latter D2D UE may wake up more frequently and the perform the operation of receiving the D2DSS. In other words, each of the two D2D UEs can configure a period of receiving the D2DSS in consideration of both of its own oscillator stability and the oscillator stability of the node that transmits the D2DSS. When the oscillator stability of the node that transmits the D2DSS is indicated through the D2DSS or PD2DSCH as described above, the UE compares it with its own oscillator stability after receiving the D2DSS or PD2DSCH. Thereafter, the UE can determine whether to receive the D2DSS with a low period or a high period. As an example of configuring a D2DSS transmission/reception period according to oscillator stability of a D2D transmission/reception node, Table 2 below shows that a UE configures periods of matching synchronization with reference to D2DSS based on the assumption that stability levels are divided into two levels.

TABLE 2

|  | When stability of a D2DSS transmission node is high | When stability of a D2DSS transmission node is low |
| --- | --- | --- |
| When stability of a D2DSS reception node is high | A period of receiving D2DSS is set to be low. | A period of receiving D2DSS is set to be high. |
| When stability of a D2DSS reception node is low | A period of receiving D2DSS is set to be high. | A period of receiving D2DSS is set to be high. |

Device Configuration According to Embodiments of the Present Invention

Figure 8:
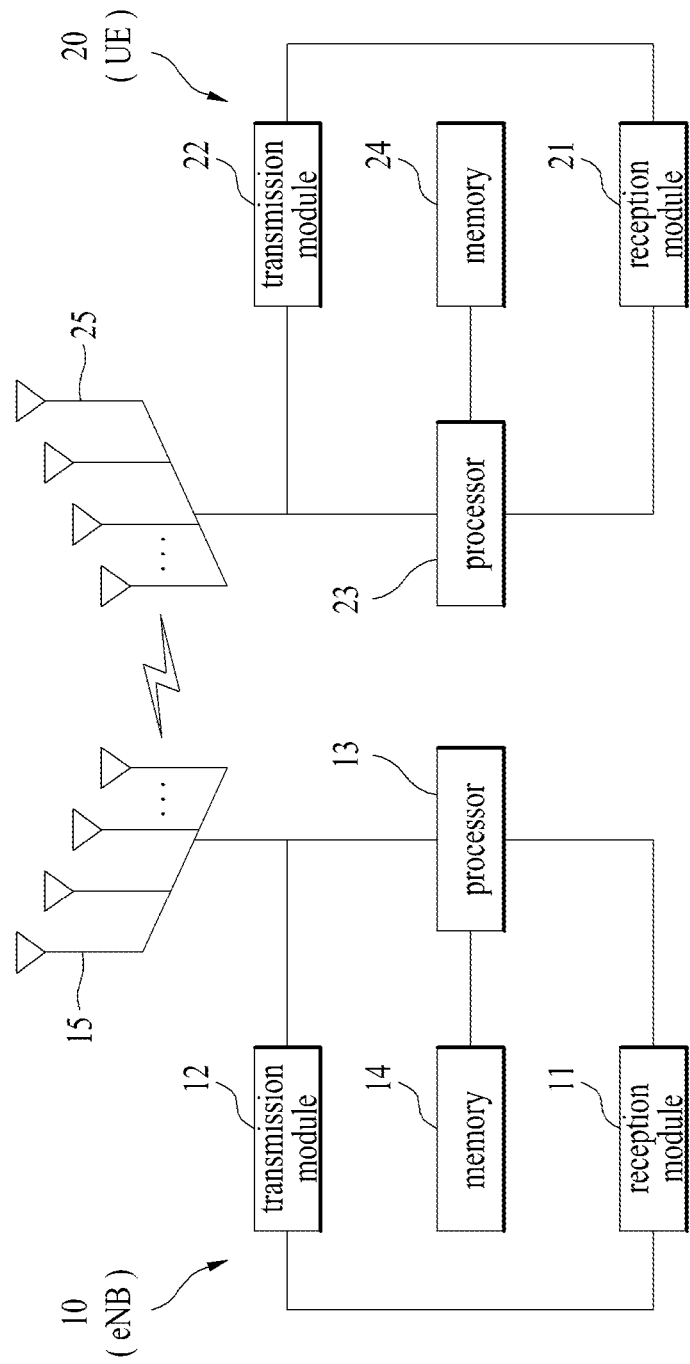
FIG. 8 is a diagram illustrating configurations of transmitting and receiving devices.

FIG. 8 is a diagram illustrating configurations of a transmission point device and a user equipment device according to embodiments of the present invention.

Referring to FIG. 8, a transmission point device 10 according to the present invention may include a receiving module 11, a transmitting module 12, a processor 13, a memory 14 and a plurality of antennas 15. The plurality of the antennas 15 may mean that the transmission point device supports MIMO transmission and reception. The receiving module 11 can receive various signals, data and information in uplink from a user equipment. The transmitting module 12 can transmit various signals, data and information in downlink to the user equipment. And, the processor 13 can control overall operations of the transmission point device 10.

The processor 13 of the transmission point device 10 according to one embodiment of the present invention can handle the details required in each of the embodiments mentioned in the foregoing description.

The processor 13 of the transmission point device 10 performs functions of operating and processing information received by the transmission point device 10, information to be externally transmitted by the transmission point device 10, and the like. The memory 14 can store the operated and processed information and the like for a prescribed period and can be substituted with such a component as a buffer (not shown in the drawing) and the like.

Referring to FIG. 8, a user equipment device 20 according to the present invention may include a receiving module 21, a transmitting module 22, a processor 23, a memory 24 and a plurality of antennas 25. The plurality of the antennas 15 may mean that the transmission point device supports MIMO transmission and reception. The receiving module 21 can receive various signals, data and information in downlink from an eNB. The transmitting module 22 can transmit various signals, data and information in uplink to the eNB. And, the processor 23 can control overall operations of the user equipment device 20.

The processor 23 of the user equipment device 20 according to one embodiment of the present invention can handle the details required in each of the embodiments mentioned in the foregoing description.

The processor 23 of the user equipment device 20 performs functions of operating and processing information received by the user equipment device 20, information to be externally transmitted by the user equipment device 20, and the like. The memory 24 can store the operated and processed information and the like for a prescribed period and can be substituted with such a component as a buffer (not shown in the drawing) and the like.

The detailed configurations of the transmission point device 10 and the user equipment device 20 can be implemented such that the details explained with reference to various embodiments of the present invention are independently applied or two or more embodiments of the present invention are simultaneously applied. And, redundant description shall be omitted for clarity.

The description of the transmission point device 10 in FIG. 8 may be equally applied to a relay node device as a downlink transmission entity or an uplink reception entity. And, the description of the user equipment device 20 in FIG. 8 may be equally applied to a relay node device as a downlink reception entity or an uplink transmission entity.

The embodiments of the present invention mentioned in the foregoing description can be implemented using various means. For instance, the embodiments of the present invention can be implemented using hardware, firmware, software and/or any combinations thereof.

In case of the implementation by hardware, a method according to each of the embodiments of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each of the embodiments of the present invention can be implemented by modules, procedures, and/or functions for performing the above-explained functions or operations. The software code is stored in a memory unit and can be driven by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

It will be apparent to those skilled in the art that the present invention may be embodied in other specific forms without departing from the spirit and essential characteristics of the invention. Thus, the above embodiments should be considered in all respects as exemplary and not restrictive. The scope of the present invention should be determined by reasonable interpretation of the appended claims and the present invention covers the modifications and variations of this invention that come within the scope of the appended claims and their equivalents. The present invention is non-limited by the embodiments disclosed herein but intends to give a broadest scope that matches the principles and new features disclosed herein. And, it is apparently understandable that an embodiment is configured by combining claims failing to have relation of explicit citation in the appended claims together or can be included as new claims by amendment after filing an application.

INDUSTRIAL APPLICABILITY

The above-described embodiments of the present invention can be applied to various kinds of mobile communication systems.

What is claimed is:

1. A method of obtaining D2D (device-to-device) synchronization, which is obtained by a user equipment in a wireless communication system, the method comprising:
    receiving a subframe containing a D2D synchronization signal;
    acquiring time/frequency synchronization based on the subframe,
    wherein if a device that transmits the D2D synchronization signal corresponds to a D2D user equipment, the subframe includes information related to frequency stability;
    estimating whether a frequency offset has occurred based on the information related to the frequency stability; and
    if the frequency stability is equal to or lower than a predetermined value, shortening a period of receiving the D2D synchronization signal,
    wherein the frequency offset is additionally caused by at least one of a difference in timing of receiving the D2D synchronization signal, a difference in D2D synchronization source, and a difference in stratum level between the user equipment and the D2D user equipment performing D2D wireless communication.

2. The method of claim 1, wherein the information related to the frequency stability is transmitted through a physical D2D synchronization channel (PD2DSCH).

3. The method of claim 1, wherein if the user equipment is in an RRC (radio resource control) idle state, the subframe includes the information related to the frequency stability.

4. The method of claim 1, wherein if the stratum level difference between the D2D equipment that transmits the D2D synchronization signal and the user equipment is equal to or greater than a predetermined value, the subframe includes the information related to the frequency stability.

5. The method of claim 1, wherein if a period of transmitting the D2D synchronization signal is equal to or greater than a predetermined value, the subframe includes the information related to the frequency stability.

6. The method of claim 1, wherein if an operating frequency band of the user equipment is equal to or greater than a predetermined value, the subframe includes the information related to the frequency stability.

7. The method of claim 1, wherein the user equipment determines whether to change the period of receiving the D2D synchronization signal based on the information related to frequency stability and a stability of an oscillator of the user equipment.

8. The method of claim 1, wherein the user equipment estimates the frequency stability through of at least one of a sequence of the D2D synchronization signal, a sequence repetition pattern of the D2D synchronization signal, and a period of transmitting the D2D synchronization signal.

9. The method of claim 1, wherein a sequence of a D2D synchronization signal used when the device that transmits the D2D synchronization signal corresponds to a base station is different from a sequence of a D2D synchronization signal used when the device that transmits the D2D synchronization signal corresponds to the D2D user equipment.

10. The method of claim 1, wherein if the frequency stability is equal to or lower than the predetermined value, the user equipment modifies D2D synchronization before transmitting and receiving a D2D signal.

11. A D2D (device-to-device) user equipment for obtaining D2D synchronization, the D2D user equipment comprising:
    a receiver; and
    a processor configured to:
        control the receiver to receive a subframe containing a D2D synchronization signal,
        acquire time/frequency synchronization based on the subframe,
        wherein if a device that transmits the D2D synchronization signal corresponds to a D2D user equipment, the subframe includes information related to frequency stability,
        estimate whether a frequency offset has occurred based on the information related to the stability of the frequency, and
        if the frequency stability is equal to or lower than a predetermined value, shorten a period of receiving the D2D synchronization signal,
    wherein the frequency offset is additionally caused by at least one of a difference in timing of receiving the D2D synchronization signal, a difference in D2D synchronization source, and a difference in stratum level between the user equipment and the D2D user equipment performing D2D wireless communication.

* * * * *